United States Patent
Tujkovic et al.

(10) Patent No.: US 7,680,206 B2
(45) Date of Patent: Mar. 16, 2010

(54) SELECTING MODULATION AND CODING LEVEL AND SPATIAL RATE FOR ORTHOGONAL FREQUENCY DOMAIN MODULATION SYSTEMS

(75) Inventors: Djordje Tujkovic, Santa Clara, CA (US); Erik Lindskog, Santa Clara, CA (US); Vara Prasad, Santa Clara, CA (US); Somichetty Gowrisankar, Santa Clara, CA (US); Erik Westman, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 575 days.

(21) Appl. No.: 11/701,072

(22) Filed: Jan. 31, 2007

(65) Prior Publication Data

US 2007/0183529 A1  Aug. 9, 2007

Related U.S. Application Data

(60) Provisional application No. 60/764,295, filed on Jan. 31, 2006.

(51) Int. Cl.
*H04B 7/02* (2006.01)
(52) U.S. Cl. .................................. 375/267; 375/347
(58) Field of Classification Search ............... 375/260, 375/267, 299, 347–349
See application file for complete search history.

(56) References Cited

U.S. PATENT DOCUMENTS

| | | | |
|---|---|---|---|
| 6,298,092 B1 | 10/2001 | Heath, Jr. et al. | |
| 2003/0112880 A1 | 6/2003 | Walton et al. | |
| 2004/0002364 A1 | 1/2004 | Trikkonen et al. | |
| 2004/0120411 A1 | 6/2004 | Walton et al. | |
| 2005/0128998 A1* | 6/2005 | Jelitto et al. | 370/349 |
| 2006/0198460 A1* | 9/2006 | Airy et al. | 375/267 |

* cited by examiner

*Primary Examiner*—Emmanuel Bayard (57) ABSTRACT

Embodiments are directed to a link adaptation method that selects the optimum transmission scheme and modulation and coding signal (MCS) level within a MIMO system, based on optimal maximum throughput on the channels. The method selects the MCS levels and spatial rate values for broadband communication systems based on the instantaneous broadband MIMO-OFDM signaling capacities. The transmission rate over the transmission channel is selected based on a comparison of the capacities achieved under diversity coding and spatial multiplexing MIMO transmission schemes. The effect of a particular receiver type or implementation can also be factored into the signaling capacity. For a fixed target probability of error, the scheme or spatial rate that has the higher instantaneous throughput is selected for transmission.

20 Claims, 5 Drawing Sheets

| SPATIAL RATE 1 | SPATIAL RATE 2 |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |

MCS LEVEL

SPATIAL RATE 1

| MCS LEVEL | SPECTRAL EFFICIENCY (Bit/Sec/Hz) | REQUIRED SINR (dB) |
|---|---|---|
| 1 | 1 | 0 |
| 2 | 2 | 3 |
| 3 | 3 | 5 |
| 4 | 4 | 7 |
| 5 | 5 | 9 |
| 6 | 6 | 11 |
| 7 | 7 | 13 |
| 8 | 8 | 15 |
| 9 | 9 | 17 |
| 10 | 10 | 19 |

FIG. 5A

SPATIAL RATE 2

| MCS LEVEL | SPECTRAL EFFICIENCY (Bit/Sec/Hz) | REQUIRED SINR (dB) |
|---|---|---|
| 1 | 2 | 0 |
| 2 | 4 | 3 |
| 3 | 6 | 5 |
| 4 | 8 | 7 |
| 5 | 10 | 9 |
| 6 | 12 | 11 |
| 7 | 14 | 13 |
| 8 | 16 | 15 |
| 9 | 18 | 17 |
| 10 | 20 | 19 |

FIG. 5B

SELECTING MODULATION AND CODING LEVEL AND SPATIAL RATE FOR ORTHOGONAL FREQUENCY DOMAIN MODULATION SYSTEMS

CROSS-REFERENCE TO RELATED APPLICATIONS

The present application claims the benefit of the U.S. Provisional Application, Ser. No. 60/764,295, entitled "Method for Selecting MCS Level and Spatial Rate for MIMO transmission in OFDM Systems" and filed on Jan. 31, 2006.

TECHNICAL FIELD

The embodiments provided herein relate generally to communication systems, and more specifically to selecting the transmission rate and modulation and coding level for a multiple-input/multiple-output wireless communication system.

BACKGROUND

Many wideband digital communication systems utilize Orthogonal Frequency-Division Multiplexing (OFDM) as the modulation scheme. OFDM uses a large number of closely spaced orthogonal sub-carriers, each of which is modulated with a conventional modulation scheme at a low symbol rate. In OFDM-based wide area broadcasting, a plurality of receivers can simultaneously receive signals from several spatially-dispersed transmitters. In these systems, OFDM is typically combined with other forms of space diversity, such as antenna arrays and multiple input/multiple output (MIMO) channels. One example of such a system is the IEEE 802.11n Wireless LAN (Local Area Network) standard.

The Modulation and Coding Scheme (MCS) is a value that determines the modulation, coding and number of spatial channels in MIMO-OFDM systems. It is a compact representation that is carried in the high throughput signal field of the channels. Fast and accurate selection of the MCS level and spatial transmission rate is crucial for exploiting the potentially high spectral efficiency of adaptive wireless MIMO-OFDM systems. Measurements for MCS level selection and/or the decision to switch to a particular spatial rate for transmission is typically made at the receiver end of the wireless link, and is then conveyed back to the transmitter side via the low rate feedback path. This process can also be performed at the transmitter based on certain known carrier information.

In many practical systems, the number of effective transmitter antennas is limited to only two. For these systems, the spatial rate selection mechanism involves selecting either diversity coding (spatial rate 1), or spatial multiplexing (spatial rate 2) as the method of MIMO transmission.

Present methods of switching between the diversity coding method and spatial multiplexing method generally base the spatial rate selection on the comparative values of the minimum Euclidean distances for diversity coding and spatial multiplexing. For a fixed spectral efficiency, the scheme which has the higher minimum Euclidean distance is usually selected for transmission. The calculation of such distances can be a rather complex process. Moreover, although such an optimization criterion may minimize the probability of error under the assumption of the fixed throughput, in systems with different possible throughput channels, such as multiple MCS-level systems, such a method may often underestimate the throughput rate in order to minimize the probability of error. Consequently, such systems may operate with less performance than is possible. Such prior art systems utilize a different optimization criteria than is used by practical link adaptation algorithms. The goal of these link adaptation algorithms is typically to maximize throughput under a fixed target probability of error, or a maximum allowed expected error rate. Present rate selection methods for MIMO-OFDM systems, however, generally do not allow for maximum throughput to be factored into the rate selection process.

BRIEF DESCRIPTION OF THE DRAWINGS

Embodiments are illustrated by way of example and not limitation in the figures of the accompanying drawings, in which like references indicate similar elements and in which.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Embodiments are directed to a link adaptation method that selects the optimum transmission scheme and modulation and coding signal (MCS) level within a MIMO system, based on optimal maximum throughput on the channels. The method selects the MCS levels and spatial rate values for broadband communication systems based on the instantaneous broadband MIMO-OFDM signaling capacities. The transmission rate over the transmission channel is selected based on a comparison of the capacities achieved under diversity coding and spatial multiplexing MIMO transmission schemes. The effect of a particular receiver type or implementation can also be factored into the signaling capacity. For a fixed target probability of error, the scheme or spatial rate that has the higher instantaneous throughput is selected for transmission. This process generally matches the optimization criteria of a typical link adaptation system. In addition, this process also leads to the efficient calculation of the effective SISO (single input/single output) signal to noise plus interference ratio (SINR), which is typically fed back along with the selected spatial rate to enable the selection of the MCS scheme to be transmitted on the top of selected MIMO transmission method. In such a case, instead of comparing instantaneous capacities, the MIMO scheme that has the higher effective SISO SINR can be selected for transmission.

The MIMO selection scheme can also accommodate auxiliary scaling factors, thus multiplying the candidate schemes' effective SINRs to create more bias towards one or the other scheme.

In general, OFDM (Orthogonal Frequency Division Multiplexing) is a modulation technique used in 802.11a WLAN, 802.16 and WiMAX technologies for transmitting large amounts of digital data over a radio wave. OFDM works by splitting the radio signal into multiple smaller sub-signals that are then transmitted simultaneously at different frequencies to the receiver. OFDM generally reduces the amount of crosstalk in signal transmissions. The MCS level and spatial rate selection system according to embodiment described herein can be applied to several receiver algorithms in MIMO OFDM wireless systems.

Figure 1:
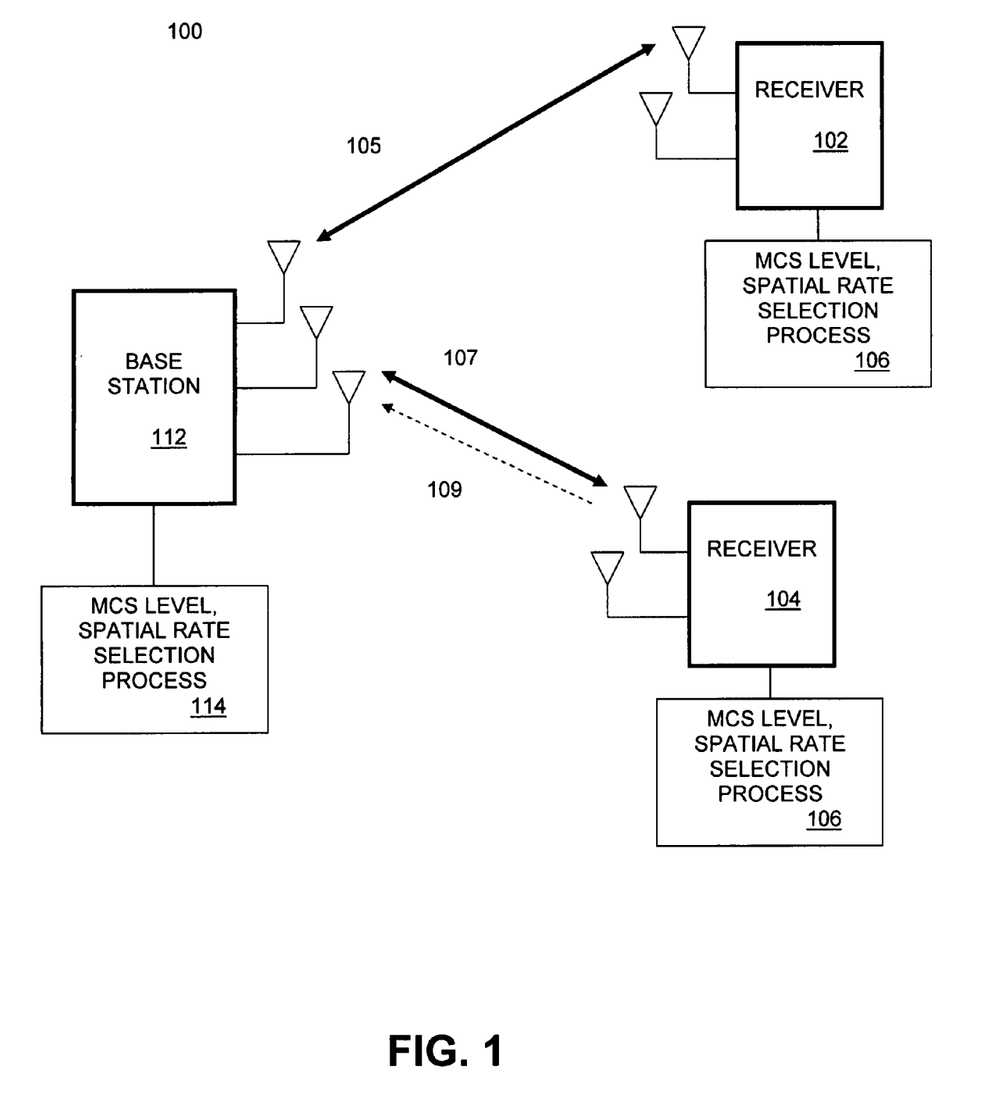
FIG. 1 illustrates a wireless system that includes a MIMO-OFDM system that implements an MCS level and spatial rate selection link adaptation system, under an embodiment.

FIG. 1 illustrates a wireless system that includes a MIMO-OFDM system that implements an MCS level and spatial rate selection link adaptation system, under an embodiment. In system 100, a base station or similar wireless transmitter 112 transmits radio or similar wireless signals to one or more MIMO receivers 102 and 104. Base station 112 includes a plurality of send/receive antennas, as do receivers 102 and 104. For the example of FIG. 1, base station 112 transmits signals 105 to receiver 102 in a downlink transmission, and receives signals 105 from receiver 102 in an uplink transmission. Likewise, base station 112 transmits signals 107 to receiver 104 in a downlink transmission, and receives signals 107 in an uplink transmission from receiver 104. In one embodiment, the base station 112 and receivers 102 and 104 transmit signals using one of at least two transmission schemes that may have different transmission rates. One transmission scheme is a diversity coding scheme, which transmits at a first transmission rate (spatial rate 1), and another transmission scheme is spatial multiplexing, which transmits at a second transmission rate (spatial rate 2).

In system 100, the receivers 102 and 104 may be any type of receiver appropriate for the transmission scheme. For example, receivers 102 and 104 may be maximum likelihood (ML) type receivers, or they may be linear receivers (LR). The type of receiver that is actually used is often dictated by the requirements of the system.

In one embodiment, the receivers 102 and 104 include a link adaptation process that comprises an MCS level and spatial rate selection process 106. In general, the link adaptation process selects the MCS level and spatial rate (transmission scheme) within a transmission link based on channel conditions. The MCS level and spatial rate selection process 106 selects the MCS level and spatial rate based on a comparison process that maximizes throughput over the link, yet maintains the required quality of signal based on maximum allowable errors. The MCS level and spatial rates are selected based on the broadband MIMO-OFDM signaling capacities of the system. The capacities can be instantaneous (on a per-symbol basis) or over a frame or series of frames, or over a period of time for an uplink or downlink transmission between the base station and receiver.

Figure 2:
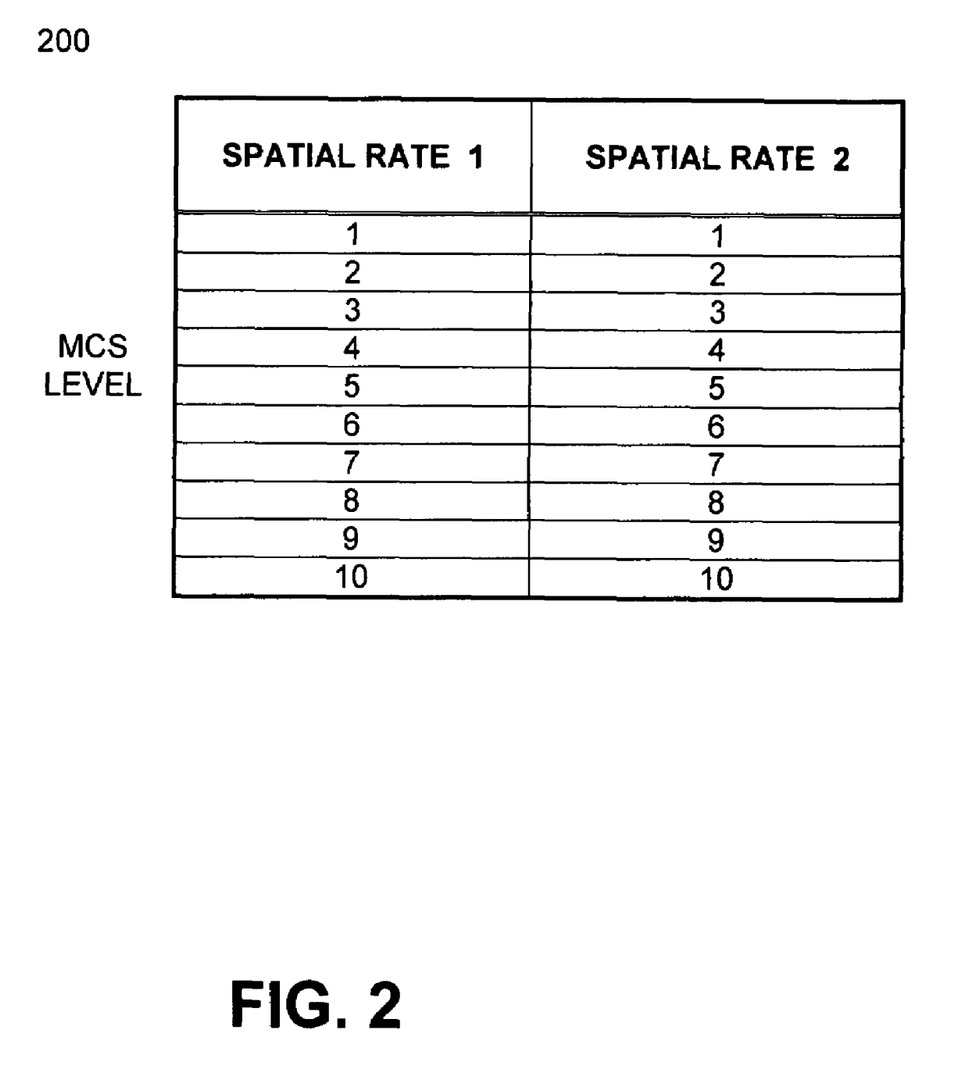
FIG. 2 is a table that illustrates a matrix of MCS levels versus spatial rate values for use in a link adaptation system, under an embodiment.

In general, for the MIMO system of FIG. 1, there are a number of variables that can be controlled to increase the system performance. In one embodiment, the MCS level and spatial rates are selected through process 106 to optimize data throughput while maintaining an acceptably low probability of error. FIG. 2 is a table that illustrates a matrix of MCS levels versus spatial rate values for use in a link adaptation system, under an embodiment. Table 200 represents the selection of MCS levels and spatial rates for a MIMO system, such as system 100 of FIG. 1. As shown in table 200, two spatial rates are available corresponding to each transmission scheme, spatial rate 1 (diversity coding) and spatial rate 2 (spatial multiplexing). For each spatial rate, various different MCS levels are available. The number of MCS levels depends on the implementation details and standards of the MIMO system, and typically ranges from seven to ten levels. The example of FIG. 2 illustrates ten MCS levels, denoted MCS levels 1-10 for each spatial rate. Using table 200 as a reference, the link adaptation process according to embodiments first selects a spatial transmission rate, that is, spatial rate 1 or spatial rate 2, and then selects a specific MCS level within the selected spatial rate. The spatial transmission rate is selected such that throughput is maximized in the spatial domain, and the MCS level is selected such that the acceptable probability of error within that spatial rate is maintained.

For an embodiment in which the MCS level and spatial rate are selected by a process 106 executed by a receiver, such as receiver 104, this transmission information is transmitted back to the base station 112 over signal 109. This results in further transmissions over a pre-defined time period, or number of frames to utilize the selected transmission rate and MCS level. Alternatively, the selection or recommendation of MCS level can be performed at the base station 112 through an MCS level and spatial rate selection process 114. For this embodiment, the base station must know or determined certain channel matrix information related to the MIMO system, as well as other information, such as noise information.

Regardless of which entity (base station or receiver) performs the selection process, the same general process steps are performed. In general terms, the transmission rate is first selected based on the highest instantaneous signaling capacity of the channel. In one embodiment, this signaling capacity is equated to an approximation of the effective SINR (signal-to-noise plus interference ratio) of the channel. The effective SINR is computed to reflect the effective SINR per spatial stream. The expected throughput is then computed by using the effective SINR to consult a table for the expected throughput as a function of the AWGN (Additive White Gaussian Noise) SINR (i.e., the effective SINR). The expected throughput is then multiplied with the spatial rate to derive the final expected throughput for the scheme. The MIMO scheme with the higher expected throughput is then selected or recommended, and the corresponding MCS level is selected or recommended. It should be noted that for purposes of description, the terms SINR and SNR may be used interchangeably to mean signal to noise plus interference levels.

Figure 3:
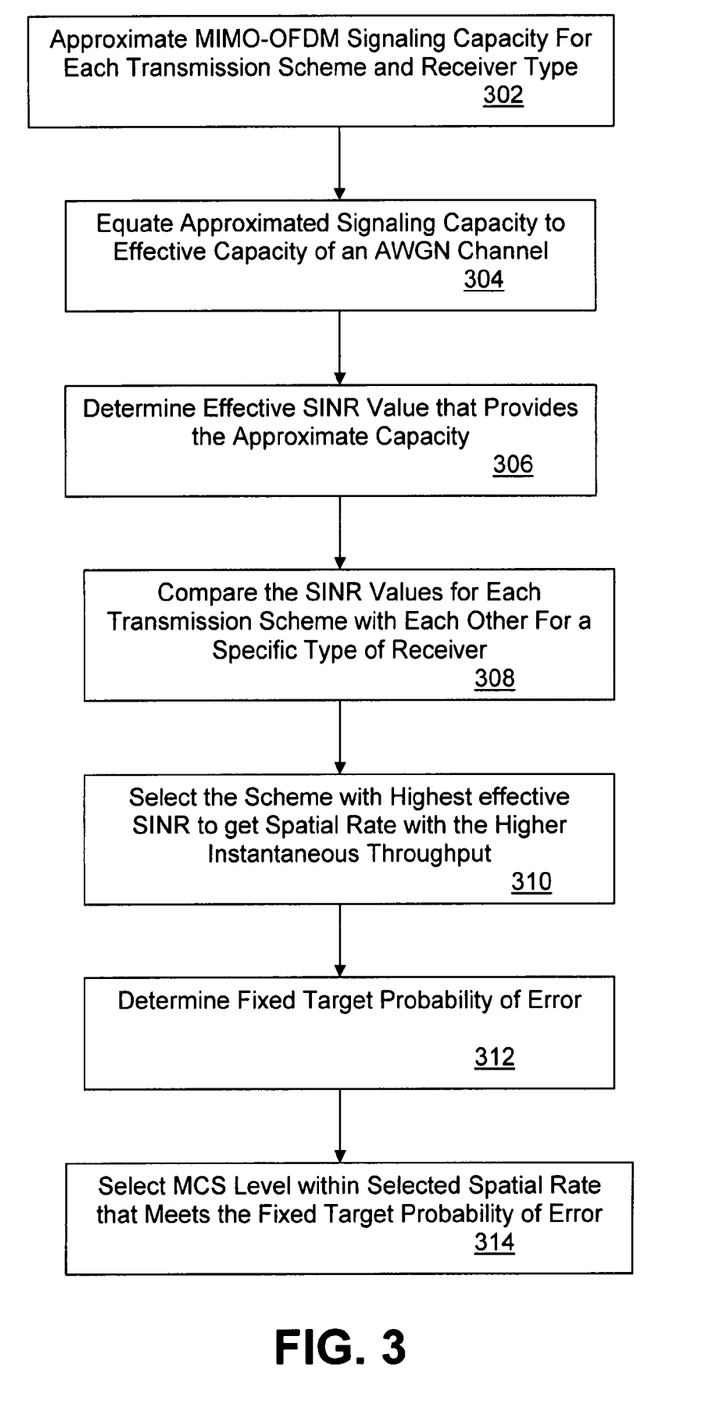
FIG. 3 is a flowchart that illustrates a spatial rate and MCS level selection method, under an embodiment.

FIG. 3 is a flowchart that illustrates a spatial rate and MCS level selection method, under an embodiment. In block 302, the MIMO-OFDM signaling capacity for each transmission scheme and receiver type is approximated. The approximated signaling capacity is then equated to the effective capacity of an AWGN channel, block 304. In block 306, the effective signal-to-noise ratio that provides the approximate capacity is then determined. The SINR values for each transmission scheme are then compare with each other for each type of receiver, block 308. In block 310, the transmission scheme with the highest effective SINR value is selected. Depending on system requirements, the required probability of error is determined, block 312. The MCS level that meets the target probability of error within the selected spatial rate is then selected, block 314. This process yields a specific MCS level and spatial rate within a table, such as table 200 of FIG. 2.

Spatial Rate Determination

In general, the link adaptation process that includes a method of selecting the optimum MCS level and spatial rate selection first starts with a determination of the spatial rate.

Figure 4:
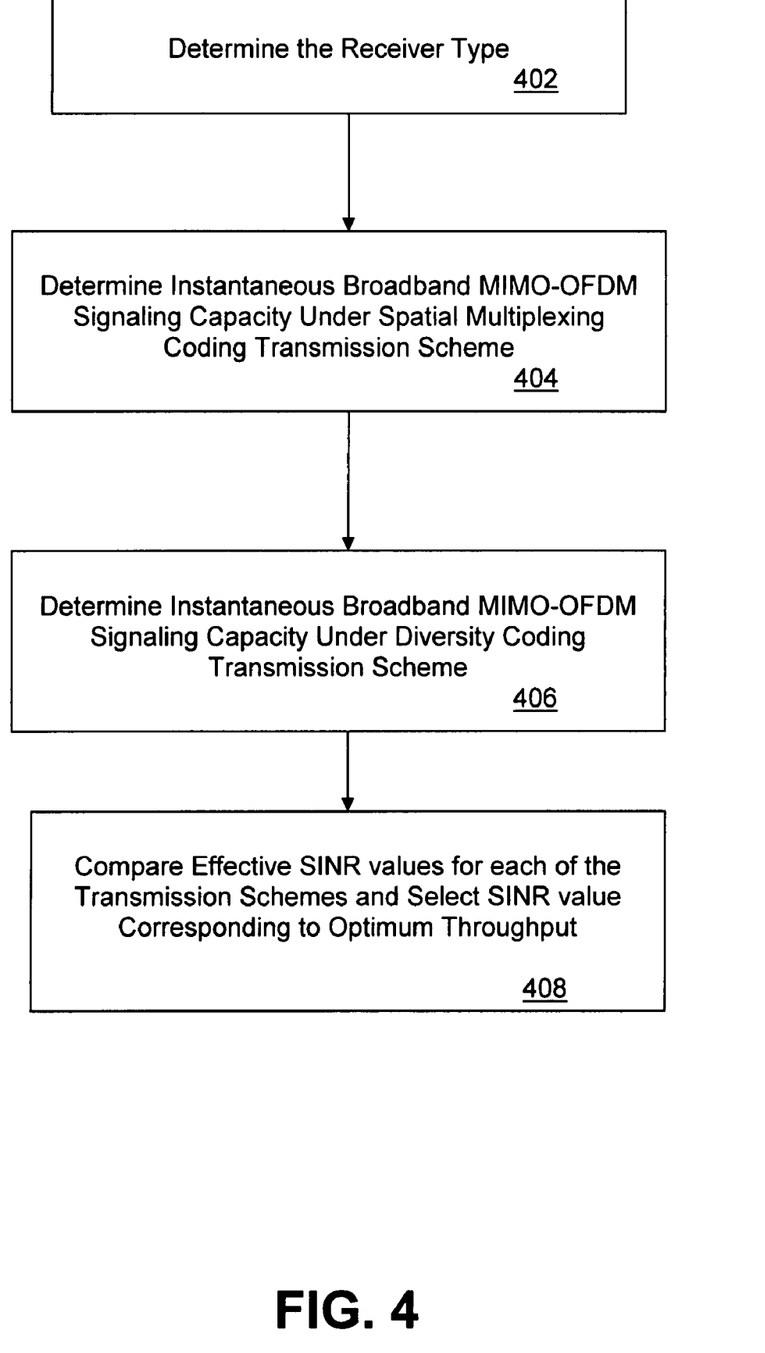
FIG. 4 is a flowchart that illustrates a spatial rate selection method, under an embodiment.

FIG. 4 is a flowchart that illustrates a spatial rate selection method, under an embodiment. In block 402, the type of receiver is determined. As stated above, in general, two or more types of receivers (e.g., ML or linear) may be available. The use of different receivers may provide different transmission characteristics, however, the type of receiver is usually fixed within a system. If the receiver type can be changed, the process of FIG. 4 can be performed separately for each type of receiver, and the receiver with the better transmission characteristics can be selected. As shown in FIG. 4, in block 404 the instantaneous broadband MIMO-OFDM signaling capacity under the spatial multiplexing transmission scheme is determined. Under spatial multiplexing, either a maximum likelihood-type receiver or a linear receiver can be used. In the case of an ML receiver, the MIMO-OFDM signaling capacity C(d, y|H) (in bits/sec/Hz) for spatial multiplexing is approximated using the following formulae:

$$C(d, y|H) = \frac{1}{K}\sum_{k=1}^{K}\log\det(I + H_k^H R_k^{-1} H_k)$$

$$= \frac{1}{K}\sum_{k=1}^{K}\log\det\left(I + \frac{1}{\sigma_{No+I,k}^2}H_k^H H_k\right)$$

$$= \frac{1}{K}\sum_{k=1}^{K}\sum_{n=1}^{N_{Tx}}\log\left(1 + \frac{\lambda_{n,k}}{\sigma_{No+I,k}^2}\right)$$

$$\approx \frac{1}{K}\sum_{k=1}^{K}\sum_{n=1}^{N_{Tx}}\log\left(\frac{\lambda_{n,k}}{\sigma_{No+I,k}^2}\right)$$

In the above equation, $N_{Tx}$ denotes the number of transmit antennas, K is total number of sub-carriers, $H_k$ is MIMO channel matrix for sub-carrier k (assumed to be unknown to transmitter and estimated at the receiver), $R_k^{-1}$ is a per tone covariance matrix of noise plus interference (approximated as diagonal with variance $\sigma_{No+I,k}^2$) and $\lambda_{n,k}$ represents the n'th eigenvalue of $H_k^H H_k$.

In the case of two antenna MIMO systems, i.e., (2, $N_{Tx}$) or ($N_{Rx}$, 2), the eigenvalues can be calculated in the closed form as follows:

$$H_k = \begin{bmatrix} \hat{H}_{1,1}[k] & \hat{H}_{1,2}[k] \\ \hat{H}_{2,1}[k] & \hat{H}_{2,2}[k] \end{bmatrix}$$

$$A = H^H H$$

$$\lambda_{n,k} = \frac{[A]_{1,1} + [A]_{2,2} \pm \sqrt{([A]_{1,1} + [A]_{2,2})^2 - 4([A]_{1,1}[A]_{2,2} - [A]_{1,2}[A]_{2,1})}}{2}$$

In one embodiment, equating the MIMO-OFDM signaling capacity to the effective capacity of an AWGN channel yields the following:

$$\log(1 + SINR_{eff}) \approx \log(SINR_{eff}) = \frac{1}{K}\sum_{k=1}^{K}\sum_{n=1}^{N_{Tx}}\log\left(\frac{\lambda_{n,k}}{\sigma_{No+I,k}^2}\right)$$

$$\log(S_{pow,eff}) - \log(NoI_{pow,eff}) = \frac{1}{K}\sum_{k=1}^{K}\sum_{n=1}^{N_{Tx}}\log(\lambda_{n,k}) - \frac{1}{K}\sum_{k=1}^{K}\sum_{n=1}^{N_{Tx}}\log(\sigma_{No+I,k}^2)$$

The effective SISO SINR for spatial multiplexing with ML receiver to be used as a candidate MIMO scheme for proposed spatial rate selection becomes:

$$SINR_{eff} = \left(\prod_{k=1}^{K}\prod_{n=1}^{N_{Tx}}\frac{\lambda_{n,k}}{\sigma_{No+I,k}^2}\right)^{\frac{1}{K}}$$

As a dB value, it can be represented as a following dB average:

$$SINR_{eff}\ [dB] = \frac{1}{K}\sum_{k=1}^{K}\sum_{n=1}^{N_{Tx}}\frac{\lambda_{n,k}}{\sigma_{No+I,k}^2}\ [dB]$$

This SINR value in decibels provides a basis for comparison with like values derived for other transmission schemes and receiver types.

If the type of receiver, as determined in block 402, is a linear receiver, the processing of block 404 utilizes the following scheme. In the case of spatial multiplexing with linear receiver, the MIMO OFDM capacity (in bits/sec/Hz) can be written as $$C(d, y|H) = \frac{1}{K}\sum_{k=1}^{K}\sum_{n=1}^{N_{Tx}}\log(1 + SINR_{n,k})$$

$$\approx \frac{1}{K}\sum_{k=1}^{K}\sum_{n=1}^{N_{Tx}}\log(SINR_{n,k})$$

where $SINR_{n,k}$ denotes post-processing SINR for spatial stream n and sub-carrier location k. The effective SISO SINR for spatial multiplexing with a linear receiver becomes:

$$SNR_{eff} = \left(\prod_{k=1}^{K}\prod_{n=1}^{N_{Tx}} SINR_{n,k}\right)^{\frac{1}{K}}$$

In decibel values, based on the following dB average, this becomes:

$$SNR_{eff}\ [dB] = \frac{1}{K}\sum_{k=1}^{K}\sum_{n=1}^{N_{Tx}} SINR_{n,k}\ [dB]$$

Once the signaling capacity for the spatial multiplexing scheme for the appropriate type of receiver has been determined, the instantaneous broadband MIMO-OFDM signaling capacity under the diversity coding transmission scheme is computed, as shown in block 406. Under diversity coding, generally a maximum likelihood-type receiver may be used, thus this is typically the receiver type that is considered for this calculation, however, in other embodiments, other types of receivers may also be possible. The MIMO-OFDM signaling capacity (in bits/sec/Hz) for diversity coding with an ML receiver is given as:

$$C(d, y|H) = \frac{1}{K}\sum_{k=1}^{K} \log\left(1 + \frac{1}{\sigma_{No+I,k}^2}\|H_k\|^2\right)$$

$$= \frac{1}{K}\sum_{k=1}^{K} \log\left(1 + \frac{1}{\sigma_{No+I,k}^2}\text{trace}(H_k H_k^*)\right)$$

$$= \frac{1}{K}\sum_{k=1}^{K} \log\left(1 + \frac{\sum_{n=1}^{N_{Tx}} \lambda_{n,k}}{\sigma_{No+I,k}^2}\right)$$

$$\approx \frac{1}{K}\sum_{k=1}^{K} \log\left(\frac{\sum_{n=1}^{N_{Tx}} \lambda_{n,k}}{\sigma_{No+I,k}^2}\right)$$

Equating the MIMO-OFDM signaling capacity to the effective capacity of an AWGN channel yields the following:

$$\log(1 + SNR_{eff}) \approx \log(SNR_{eff}) = \frac{1}{K}\sum_{k=1}^{K}\log\left(\frac{\sum_{n=1}^{N_{Tx}} \lambda_{n,k}}{\sigma_{No+I,k}^2}\right)$$

$$\log(S_{pow,eff}) - \log(NoI_{pow,eff}) =$$

$$\frac{1}{K}\sum_{k=1}^{K}\log\left(\sum_{n=1}^{N_{Tx}} \lambda_{n,k}\right) - \frac{1}{K}\sum_{k=1}^{K}\log(\sigma_{No+I,k}^2)$$

The effective SISO SINR for diversity coding to be used as a candidate MIMO scheme for proposed spatial rate selection becomes:

$$SINR_{eff} = \left(\prod_{k=1}^{K}\sum_{n=1}^{N_{Tx}} \frac{\lambda_{n,k}}{\sigma_{No+I,k}^2}\right)^{\frac{1}{K}}$$

As a decibel value, it can be represented as a following dB average:

$$SNR_{eff}\,[dB] = \frac{1}{K}\sum_{k=1}^{K}\left(\frac{\sum_{n=1}^{N_{Tx}} \lambda_{n,k}}{\sigma_{No+I,k}^2}\right)[dB]$$

Once the effective SINR values are obtained for all of the possible (e.g., three) types of transmission scheme and receiver combinations, the transmission rate can be selected. This is shown as block 410 of FIG. 4. In one embodiment, the MIMO transmission scheme with the highest effective SISO SINR is selected for transmission. This selection method can be accompanied with auxiliary scaling factors $\alpha$ and $\beta$ multiplying candidate schemes' effective SINRs to create more bias towards one or the other scheme. The following equation illustrates an example of an equation to select the appropriate transmission scheme ("MIMO scheme") based on the effective SINR values as weighted with scaling factors $\alpha$ and $\beta$:

$$\text{mimo\_scheme} = \underset{arg \in \left\{\begin{array}{l}Spatial\_multip\\Diver\_coding\end{array}\right\}}{\operatorname{argmax}} \{\alpha \cdot SINR_{eff}(\text{Spatial\_multip}), \beta \cdot SINR_{eff}(\text{Div\_coding})\}$$

The selected transmission scheme effectively dictates the spatial rate, i.e., spatial rate 1 or spatial rate 2. The weighting factors can be defined and quantified for any number of factors that may bias one scheme over the other. These can include, power consumption, cost, and the like.

As stated above, the link adaptation method may be executed at either the receiver or base station. If the selection of the spatial rate and MCS level is performed at the base station, the calculated effective SINRs should be further combined with throughput versus the AWGN SNR (effective SINR) tables for different MCS levels for the MCS method used. The auxiliary scaling factors that multiply candidate schemes' effective SINRs can be also added. For the embodiment in which the selection of spatial rate is performed at the base station, such as through process 114, the base station process 114 would calculate the $\lambda_{n,k}$ eigenvalues. In this case, the base station must know the appropriate factors, such as, number of sub-carriers, MIMO channel matrix, per tone covariance matrix, as well as any other relevant variables. At least some of this information may be provided to the base station from one or more of the receivers, or it may be derived or programmed into the base station through a separate process.

In an alternative embodiment, the MIMO-OFDM signaling capacity per spatial stream (in bits/sec/Hz) is used to determine the appropriate transmission scheme. The basic calculations for this embodiment, are generally the same as discussed with respect to FIG. 4, with the added factor for the total number of spatial streams, along with the total number of sub-carriers. The MIMO-OFDM signaling capacity (in bits/sec/Hz) for spatial multiplexing with an ML receiver for this embodiment is given as:

$$C(d, y|H) = \frac{1}{KM}\sum_{k=1}^{K}\log\det(I + H_k^H R_k^{-1} H_k)$$

$$= \frac{1}{KM}\sum_{k=1}^{K}\log\det\left(I + \frac{1}{\sigma_{No+I,k}^2} H_k^H H_k\right)$$

$$= \frac{1}{KM}\sum_{k=1}^{K}\sum_{n=1}^{M}\log\left(1 + \frac{\lambda_{n,k}}{\sigma_{No+I,k}^2}\right)$$

$$\approx \frac{1}{KM}\sum_{k=1}^{K}\sum_{n=1}^{M}\log\left(\frac{\lambda_{n,k}}{\sigma_{No+I,k}^2}\right)$$

In the above equation, K is total number of sub-carriers, M is the number of spatial streams transmitted, $H_k$ is MIMO channel matrix for sub-carrier k (assumed to be unknown to transmitter and estimated at the receiver), $R_k^{-1}$ is a per tone covariance matrix of noise plus interference (approximated as diagonal with variance $\sigma_{No+I,k}^2$) and $\lambda_{n,k}$ represents the n'th eigenvalue of $H_k^H H_k$. In the case of (2, M) or ($N_{Rx}$, 2) MIMO systems, eigenvalues can be calculated in the closed form $$H_k = \begin{bmatrix} \hat{H}_{1,1}[k] & \hat{H}_{1,2}[k] \\ \hat{H}_{2,1}[k] & \hat{H}_{2,2}[k] \end{bmatrix}$$

$$A = H^H H$$

$$\lambda_{n,k} = \frac{[A]_{1,1} + [A]_{2,2} \pm \sqrt{([A]_{1,1} + [A]_{2,2})^2 - 4([A]_{1,1}[A]_{2,2} - [A]_{1,2}[A]_{2,1})}}{2}$$

Equating the MIMO-OFDM signaling capacity per spatial stream to the effective capacity of an AWGN channel yields:

$$\log(1 + SNR_{\mathit{eff}}) \approx \log(SNR_{\mathit{eff}}) = \frac{1}{KM} \sum_{k=1}^{K} \sum_{n=1}^{M} \log\left(\frac{\lambda_{n,k}}{\sigma_{No+I,k}^2}\right)$$

$$\log(S_{pow,\mathit{eff}}) - \log(NoI_{pow,\mathit{eff}}) =$$

$$\frac{1}{KM} \sum_{k=1}^{K} \sum_{n=1}^{M} \log(\lambda_{n,k}) - \frac{1}{KM} \sum_{k=1}^{K} \sum_{n=1}^{M} \log(\sigma_{No+I,k}^2)$$

The effective SISO SINR for spatial multiplexing with ML receiver to be used as a candidate MIMO scheme for proposed spatial rate selection becomes:

$$SINR_{\mathit{eff}} = \left(\prod_{k=1}^{K} \sum_{n=1}^{N_{Tx}} \frac{\lambda_{n,k}}{\sigma_{No+I,k}^2}\right)^{\frac{1}{KM}}$$

As a dB value, it can be represented as a following dB average:

$$SNR_{\mathit{eff}} \text{ [dB]} = \frac{1}{KM} \sum_{k=1}^{K} \sum_{n=1}^{M} \frac{\lambda_{n,k}}{\sigma_{No+I,k}^2} \text{ [dB]}$$

In case of spatial multiplexing with linear receiver, the MIMO OFDM capacity per stream (in bits/sec/Hz) can be written as:

$$C(d, y|H) = \frac{1}{KM} \sum_{k=1}^{K} \sum_{n=1}^{M} \log(1 + SINR_{n,k})$$

$$\approx \frac{1}{KM} \sum_{k=1}^{K} \sum_{n=1}^{M} \log(SINR_{n,k})$$

where $SINR_{n,k}$ denotes post-processing SINR for spatial stream n and sub-carrier location k.

The effective SISO SINR for spatial multiplexing with a linear receiver to be used as a candidate MIMO scheme for proposed spatial rate selection becomes $$SNR_{\mathit{eff}} = \left(\prod_{k=1}^{K} \prod_{n=1}^{M} SINR_{n,k}\right)^{\frac{1}{KM}}$$

On a decibel scale based, this can be expressed as:

$$SNR_{\mathit{eff}} \text{ [dB]} = \frac{1}{KM} \sum_{k=1}^{K} \sum_{n=1}^{M} SINR_{n,k} \text{ [dB]}$$

The MIMO-OFDM signaling capacity (in bits/sec/Hz) for diversity coding is generally given as:

$$C(d, y|H) = \frac{1}{K} \sum_{k=1}^{K} \log\left(1 + \frac{1}{\sigma_{No+I,k}^2} \|H_k\|^2\right)$$

$$= \frac{1}{K} \sum_{k=1}^{K} \log\left(1 + \frac{1}{\sigma_{No+I,k}^2} \text{trace}(H_k H_k^*)\right)$$

$$= \frac{1}{K} \sum_{k=1}^{K} \log\left(1 + \frac{\sum_{n=1}^{N_{Tx}} \lambda_{n,k}}{\sigma_{No+I,k}^2}\right)$$

$$\approx \frac{1}{K} \sum_{k=1}^{K} \log\left(\frac{\sum_{n=1}^{N_{Tx}} \lambda_{n,k}}{\sigma_{No+I,k}^2}\right)$$

Equating the MIMO-OFDM signaling capacity to the effective capacity of an AWGN channel yields:

$$\log(1 + SNR_{\mathit{eff}}) \approx \log(SNR_{\mathit{eff}}) = \frac{1}{K} \sum_{k=1}^{K} \log\left(\frac{\sum_{n=1}^{N_{Tx}} \lambda_{n,k}}{\sigma_{No+I,k}^2}\right)$$

$$\log(S_{pow,\mathit{eff}}) - \log(NoI_{pow,\mathit{eff}}) =$$

$$\frac{1}{K} \sum_{k=1}^{K} \log\left(\sum_{n=1}^{N_{Tx}} \lambda_{n,k}\right) - \frac{1}{K} \sum_{k=1}^{K} \log(\sigma_{No+I,k}^2)$$

The effective SISO SINR for diversity coding to be used as a candidate MIMO scheme for proposed spatial rate selection becomes:

$$SINR_{\mathit{eff}} = \left(\prod_{k=1}^{K} \sum_{n=1}^{N_{Tx}} \frac{\lambda_{n,k}}{\sigma_{No+I,k}^2}\right)^{\frac{1}{K}}$$

On a decibel scale, this can be represented as the following dB average:

$$SNR_{eff} \text{ [dB]} = \frac{1}{K}\sum_{k=1}^{K}\left(\frac{\sum_{n=1}^{N_{Tx}}\lambda_{n,k}}{\sigma^2_{No+I,k}}\right) \text{ [dB]}$$

Figure 5A:
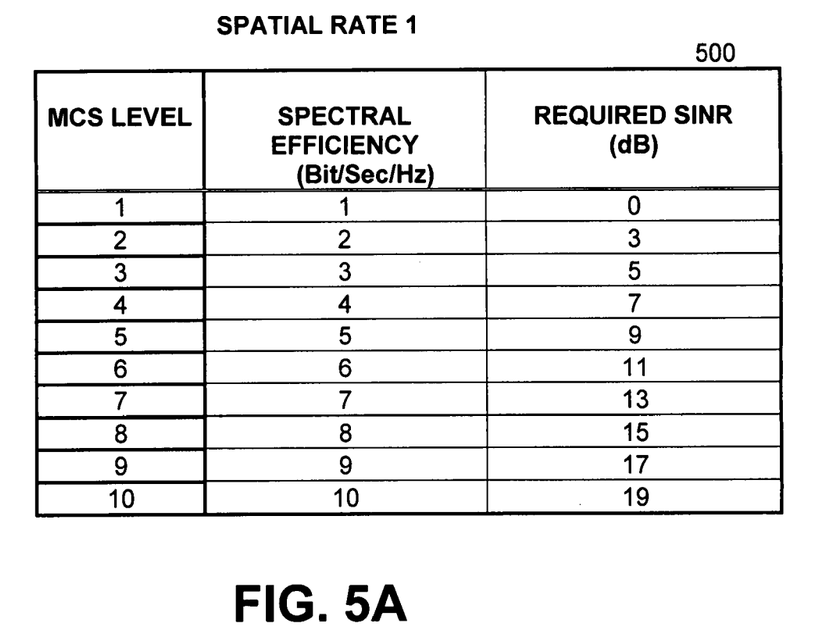
FIG. 5A is a table that illustrates an example of spectral efficiency values and required signal-to-noise ratios for a number of different MCS levels within a first spatial rate, under an embodiment.
Figure 5B:
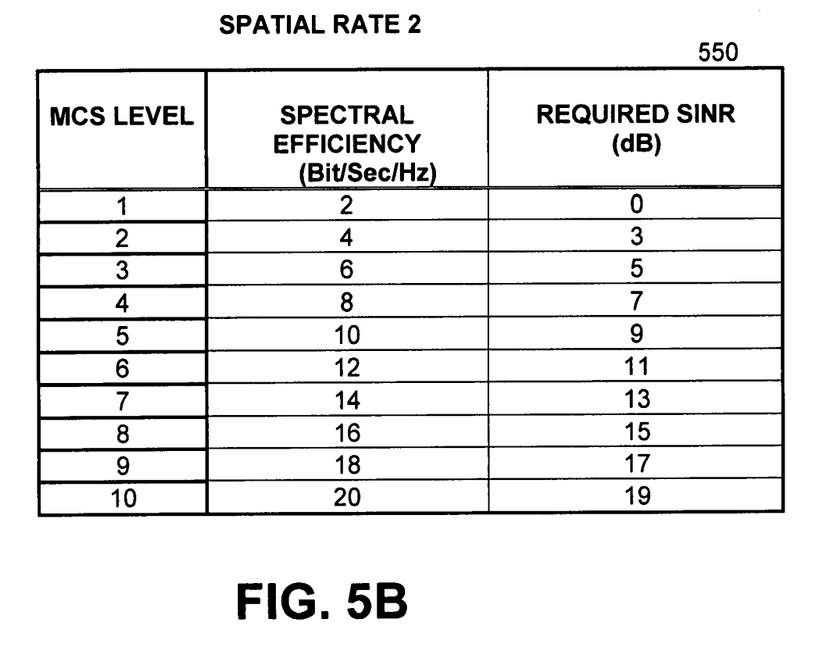
FIG. 5B is a table that illustrates an example of spectral efficiency values and required signal-to-noise ratios for a number of different MCS levels within a second spatial rate, under an embodiment.

For this embodiment, in which the signaling capacity is determined per spatial stream, the process of selecting the appropriate spatial rate and MCS scheme involves the use of table look-up procedures. These tables contain the spectral efficiencies and required SINR values for corresponding MCS levels for each of the possible spatial rates. FIG. 5A is a table that illustrates an example of spectral efficiency values and required signal-to-noise ratios for a number of different MCS levels within a first spatial, under an embodiment; and FIG. 5B is a table that illustrates an example of spectral efficiency values and required signal-to-noise ratios for a number of different MCS levels within a second spatial rate, under an embodiment. These tables illustrate values for a given target probability of error, such as a 1% probability of error. If different probabilities of error are desired, the SINR figure generally changes. In general, the tables can be populated by simulations, laboratory derived data, or any other appropriate means. In one embodiment, the required signal-to-noise ratios for a target probability of error over an AWGN channel for each MCS level within each transmission scheme, wherein each MCS has a corresponding spectral efficiency is determined. Next, the effective SINR for each transmission scheme over the given channel is determined. Using either table 500 for spatial rate 1, or table 550 for spatial rate 2, the MCS level whose required SINR from the table is closest to, but not greater than the effective SINR calculated for that transmission scheme, and for the receiver type is then selected.

As an example, presume that the effective SINR for spatial rate 1 is 10, from table 500, the closest required SINR is 9, which corresponds to MCS level with spectral efficiency 5. Similarly, presume that the effective SINR for spatial rate 2 for the same given channel is 6. From table 550, the closest required SINR is 5, which corresponds to MCS level 3 with a corresponding spectral efficiency of 6. Since the spectral efficiency of rate 2 is higher than that for rate 1, spatial rate 2 and MCS level 3 is selected for communication. In the event that there is a tie between the spectral efficiency numbers generated for both transmission schemes, other weighting factors can be used to select between them. The SINR values can be weighted prior to matching with the required SINR.

For the first embodiment in which the spatial rate has first been selected, such as through the following equation, $$\text{mimo\_scheme} = \underset{arg \in \left\{\begin{array}{l}Spatial\_multip,\\Diver\_coding\end{array}\right\}}{\text{argmax}} \{\alpha \cdot SINR_{eff}(\text{Spatial\_multip}), \beta \cdot SINR_{eff}(\text{Div\_coding})\}$$

the optimum MCS level can be selected using the appropriate table 500 or 550 shown in FIG. 5A or 5B. Based on the selected transmission scheme, the effective SINR for the chosen transmission scheme is matched to the closest required SINR in the corresponding table for that transmission rate. Based on the matched required SINR the MCS level is then derived the table.

Aspects of the MCS level and spatial rate selection method described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the MCS level and spatial rate selection method include: microcontrollers with memory (such as electronically erasable programmable read only memory (EEPROM)), embedded microprocessors, firmware, software, etc. Furthermore, aspects of the described methods may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the systems and methods embodying the link adaptation system including MCS level and spatial rate selection methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the MCS level and spatial rate selection method is not intended to be exhaustive or to limit the systems and methods to the precise form disclosed. While specific embodiments of, and examples for, the MCS level and spatial rate selection method are described herein for illustrative purposes, various equivalent modifications are possible within the scope of other systems and methods, as those skilled in the relevant art will recognize. The teachings of the noise power measurement methods provided herein can be applied to other processing systems and methods, not only for the systems and methods described above.

The elements and acts of the various embodiments described above can be combined to provide further embodiments. These and other changes can be made to the noise power measurement methods in light of the above detailed description.

What is claimed is:

1. A method of optimizing transmission performance in a wireless multiple-input/multiple output (MIMO) system, comprising:
   determining a type of receiver for each possible transmission scheme of the MIMO system;
   selecting a transmission rate from a selection of at least two transmission rates based on at least a first transmission scheme and a second transmission scheme in the MIMO system;
   within the selected transmission rate, selecting a modulation and coding level, the selected modulation and coding level dictating a minimum probability of data transmission error in the system using the selected transmission rate, wherein the selected transmission rate and selected modulation and coding scheme transmit data within the MIMO system at a rate substantially equal to the broadband signaling capacity of the MIMO system.

2. The method of claim 1 wherein the MIMO system comprises an orthogonal frequency domain modulation (OFDM) system.

3. The method of claim 1 wherein the first transmission scheme is a diversity coding scheme and the second transmission scheme is a spatial multiplexing scheme.

4. The method of claim 1 further comprising:
   approximating a signaling capacity of a given channel for each of the at least two transmission rates;
   equating the approximated signaling capacity of the given channel to an effective capacity of an Additive White Gaussian Noise (AWGN) channel;
   determining an effective signal-to-noise ratio which, over the AWGN channel, provides the same signaling capacity over the given channel;
   comparing the effective signal-to-noise ratio for each transmission rate of the at least two transmission rates with the other transmission rates of the at least two transmission rates; and
   selecting the transmission rate with the highest effective signal-to-noise ratio.

5. The method of claim 4 wherein the effective signal-to-noise ratio for each transmission rate of the at least two transmission rates are weighted by one or more weighting factors.

6. The method of claim 5 wherein the weighting factors provide a bias for one transmission rate over the other transmission rates, and wherein the weighting factors quantify characteristics selected from the group consisting of: receiver quality for each transmission rate of the at least two transmission rates, relative power consumption of each transmission rate, and cost of implementing each transmission rate.

7. The method of claim 4 wherein the effective signal-to-noise ratio that provides the approximate capacity is determined for a number of frames or for a number of symbols per transmission burst between a base station and a receiver coupled over a wireless OFDM network.

8. The method of claim 7 further comprising selecting the transmission rate whose weighted average effective SINR is largest.

9. The method of claim 1 further comprising populating a table with required signal-to-noise ratios for a target probability of error over an AWGN channel for each MCS level within each transmission scheme, wherein each MCS has a corresponding spectral efficiency.

10. The method of claim 9 further comprising determining the effective SINR for each transmission over the given channel.

11. The method of claim 10 further comprising selecting the MCS whose required SINR from the table is closest to, but not greater than the effective SINR calculated for that transmission scheme, and for the receiver type.

12. A method of selecting operating characteristics of a multiple input/multiple output (MIMO) system, comprising:
    approximating a signaling capacity of a given channel for at least two possible transmission rates of the MIMO system;
    equating the approximated signaling capacity of the given channel to an effective capacity of an Additive White Gaussian Noise (AWGN) channel;
    determining an effective signal-to-noise ratio which, over the AWGN channel, provides the same signaling capacity over the given channel;
    comparing the effective signal-to-noise ratio for each transmission rate of the at least two possible transmission rates with the other transmission rates of the at least two possible transmission; and
    selecting the transmission rate with the highest effective signal-to-noise ratio as the transmission scheme for communication over the MIMO system.

13. The method of claim 12 further comprising
    populating a table with a range of spectral efficiency values derived from the effective signal-to-noise ratio for each transmission rate indexed on a range of possible modulation and coding levels;
    associating a required signal-to-noise ratio with each of the modulation and coding levels; and
    selecting the modulation and coding level that meets the minimum probability of data transmission error in the system.

14. The method of claim 13 wherein the MIMO system comprises an orthogonal frequency domain modulation (OFDM) system, and wherein the first transmission scheme is a diversity coding scheme and the second transmission scheme is a spatial multiplexing scheme.

15. The method of claim 14 wherein the effective signal-to-noise ratio for each transmission rate of the at least two transmission rates are weighted by one or more weighting factors, wherein the weighting factors provide a bias for one transmission rate over the other transmission rates, and wherein the weighting factors quantify characteristics selected from the group consisting of: receiver quality for each transmission rate of the at least two transmission rates, relative power consumption of each transmission rate, and cost of implementing each transmission rate.

16. The method of claim 13 further comprising determining a type of receiver for each possible transmission scheme of the MIMO system, and performing the selection of transmission rate and selection of the modulation and coding level for the determined receiver type, wherein the selected transmission rate and modulation and coding level transmit data within the MIMO system at a rate substantially equal to the broadband signaling capacity of the MIMO system for the receiver type.

17. A system comprising:

a multiple input/multiple output (MIMO) base station;

a MIMO receiver coupled to the base station over a MIMO-OFDM wireless link, the MIMO receiver executing a process configured to:

select a transmission rate from a selection of at least two transmission rates based on at least a first transmission scheme and a second transmission scheme in the system, and select a modulation and coding level within the selected transmission rate, the selected modulation and coding level dictating a minimum probability of data transmission error in the system using the selected transmission rate, wherein the selected transmission rate and selected modulation and coding scheme transmit data within the system at a rate substantially equal to the broadband signaling capacity of the system.

18. The system of claim 17 wherein the first transmission scheme is a diversity coding scheme and the second transmission scheme is a spatial multiplexing scheme.

19. The system of claim 17 wherein the process is further configured to:

approximate a signaling capacity of a given channel for each of the at least two transmission rates;

equate the approximated signaling capacity of the given channel to an effective capacity of an Additive White Gaussian Noise (AWGN) channel;

determine an effective signal-to-noise ratio which, over the AWGN channel, provides the same signaling capacity over the given channel;

compare the effective signal-to-noise ratio for each transmission rate of the at least two transmission rates with the other transmission rates of the at least two transmission rates; and select the transmission rate with the highest effective signal-to-noise ratio for the receiver type corresponding to the receiver.

20. The system of claim 19 wherein the process is further configured to:

populate a table with a range of spectral efficiency values derived from the effective signal-to-noise ratio for each transmission rate indexed on a range of possible modulation and coding levels;

associate a required signal-to-noise ratio with each of the modulation and coding levels; and select the modulation and coding level that meets the minimum probability of data transmission error in the system.

\* \* \* \* \*